United States Patent Office 3,714,205
Patented Jan. 30, 1973

3,714,205
PROCESS FOR THE MANUFACTURE OF BLUE DISPERSION DYESTUFFS
Eduard Moergeli, Muttenz, Switzerland, assignor to Ciba-Geigy AG, Basel, Switzerland
No Drawing. Filed Oct. 22, 1969, Ser. No. 868,587
Claims priority, application Switzerland, Oct. 30, 1968, 16,181/68; Sept. 12, 1969, 13,828/69
Int. Cl. C09b 1/50
U.S. Cl. 260—380
7 Claims

ABSTRACT OF THE DISCLOSURE

Process for the manufacture of blue dispersion dyestuffs, wherein a 1,5-dibromo-4,8-diacylaminoanthraquinone or a 1,8-dibromo-4,5-diacylaminoanthraquinone is heated with sulphuric acid, optionally containing $SO_3$, in the presence of boric acid and the resulting bromine-containing 1,5-dihydroxy-4,8-diamino- or 1,8-dihydroxy-4,5-diamino-anthraquinone is optionally treated with an alkylating agent.

---

The present invention provides a process for preparing dispersion dyestuffs wherein a 1,5-dibromo-4,8- or 1,8-dibromo-4,5-diacylaminoanthraquinone is heated with sulphuric acid, optionally containing $SO_3$, in the presence of boric acid and the resulting bromine-containing 1,5-dihydroxy-4,8-diamino- or 1,8-dihydroxy - 4,5 - diamino-anthraquinone is optionally treated with an alkylating agent.

The dihydroxy-diacylaminoanthraquinones which serve as starting substances can for example contain, as acyl residues, the residues of aromatic carboxylic acids, especially benzenecarboxylic acids, or preferably the residues of lower aliphatic monocarboxylic acids, for example, of formic acid, acetic acid, propionic acid or butyric acid. Such starting substances which possess a urethane group as the acylamino group can also be used for the process according to the invention. As examples, the following compounds may be mentioned:

1,5-dibromo-4,8-diformylaminoanthraquinone,
1,5-dibromo-4,8-diacetylaminoanthraquinone,
1,5-dibromo-4,8-di-(chloracetyl)-aminoanthraquinone,
1,5-dibromo-4,8-dipropionylaminoanthraquinone,
1,5-dibromo-4,8-dibutyrylaminoanthraquinone,
1,5-dibromo-4,8-dibenzoylaminoanthraquinone,
1,5-dibromo-4,8-di-(methoxycarbonylamino)-anthraquinone,
1,5-dibromo-4,8-di-(ethoxycarbonylamino)-anthraquinone,
1,8-dibromo-4,5-diformylaminoanthraquinone,
1,8-dibromo-4,5-diacetylaminoanthraquinone, and
1,8-dibromo-4,5-dibenzoylaminoanthraquinone.

It is also possible to use mixtures of 1,5-dibromo-4,8-diacylaminoanthraquinones and 1,8-dibromo-4,5-diacylaminoanthraquinones as starting substances.

The dibromodiacylaminoanthraquinones are advantageously obtained by bromination of a corresponding diacylaminoanthraquinone in the presence of water according to the process of French patent specification 1,574,809.

Appropriately, at least 5 parts of sulphuric acid and at least 0.1 part of boric acid are used per 1 part of the dibromodiacylaminoanthraquinone. Especially good results are obtained using sulphuric acid containing not more than 40% of $SO_3$. The reaction temperature used is preferably within the range of from 40 to 200° C., especially within the range of from 100 to 180° C.

For working-up, the reaction mixture can be poured into ice water, whereupon the dyestuff precipitates and can be filtered off.

The dyestuffs obtained represent mixtures which on average contain about 0.5 to 1.5 bromine atoms in the molecule. They are free of sulphonic acid groups and have a first-class affinity and excellent structure for hydrophobic fibres, for example, of cellulose acetate, polyamides and especially polyesters. Depending on the nature of the acyl residue in the starting substances used, pure blue to reddish-tinged blue dyeings of very good fastness to light are obtained. The dyestuffs also show good wool reserve. A part of the dyestuffs obtainable according to the invention are also outstandingly suitable for transfer printing.

The dyestuffs obtained can further be treated with an alkylating agent. The alkylation can be achieved very simply by heating the bromine-containing dihydroxydiaminoanthraquinone with formaldehyde or a formaldehyde-releasing agent or an aliphatic alcohol, for example, ethanol, or especially methanol, in concentrated sulphuric acid. The process is appropriately carried out at a temperature within the range of from 100 to 150° C.

Further, it is also possible to use other customary alkylating agents, for example alkyl halides, for example, methyl chloride, methyl bromide or methyl iodide, ethyl chloride or ethyl bromide, and also alkyl esters of sulphuric acids or aromatic sulphonic acids, for example, dimethyl sulphate, diethyl sulphate, p-toluenesulphonic acid methyl, ethyl, propyl or butyl ester, and trimethyloxonium fluoborate.

It is furthermore also possible to use agents which are capable of introducing a substituted alkyl group, for example, benzyl chloride, acrylonitrile or chloroformic acid chloralkyl esters, the latter being able to form a heterocyclic ring of formula

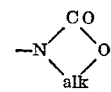

with the amino group. On heating the intermediate product thus obtained with an aqueous alkali hydroxide solution, the ring is hydrolysed and the corresponding hydroxyalkylaminoanthraquinone is formed, with carbon dioxide being split off.

The reaction with an alkyl halide, sulphuric acid and a sulphonic acid ester and a chloroformic acid alkyl ester appropriately takes place in an inert organic solvent, for example hydrocarbons, for example, benzene, toluene or xylene, halogenated hydrocarbons, for example, carbon tetrachloride, tetrachlorethane, chlorobenzene, o-dichlorobenzene or nitrohydrocarbons, for example, nitrobenzene.

Since the hydrolysis of a 1-brom-4-acylaminoanthraquinone with sulphuric acid yields a bromine-free 1-hydroxy-4-aminoanthraquinone (compare French patent specification 1,574,809), it is surprising that the hydrolysis of the dibromodiacylaminoanthraquinones yields bromine-containing dihydroxydiaminoanthraquinones which were hitherto only accessible either through bromination of the expensive dihydroxydiaminoanthraquinones or through hydrolysis of tri- or tetra-bromodiaminoanthraquinones, with the dyestuffs obtainable according to the last-mentioned process showing an inadequate wool reserve.

The success of the process according to the invention is also surprising in view of French patent specification 798,041, since this mentions that anthraquinones containing acetylamino groups on heating with 20% strength oleum change to the corresponding anthrapyridones.

The following examples illustrate the invention. Unless otherwise stated, the parts denote parts by weight and the percentages denote percentages by weight.

EXAMPLE 1

19.6 parts of boric acid are dissolved at 100° C. in 492 parts of 8.5% strength oleum, whilst stirring. The solution is cooled to 70° C. and 40 parts of 1,5-dibromo-4,8-diacetylaminoanthraquinone are introduced. The temperature is raised to 135 to 140° C. during 1 hour and the mixture is stirred for 5 hours. After cooling, the solution is poured into 3000 parts of ice water, and the dyestuff which has separated out is filtered off, washed first with water and then with aqueous ammonia, and dried. 29 parts of a blue dyestuff are obtained which contains 19% of bromine and which after conversion into an aqueous dispersion dyes polyethylene terephthalate fibres strong pure blue and light-fast shades.

If the 1,5-dibromo-4,8-diacetylaminoanthraquinone is replaced by the same amount of 1,5-dibromo-4,8-dibenzoylaminoanthraquinone, a dyestuff with a bromine content of 29% is obtained which produces somewhat more reddish-tinged but also strong and fast blue shades.

If 1,8 - dibromo - 4,5 - dibenzoylaminoanthraquinone is treated in the same manner, a fast blue dyestuff with a bromine content of 21% is obtained. It is especially suitable for transfer printing on polyester fabrics.

On treating 1,5-dibromo-4,8-di-(ethoxycarbonylamino)-anthraquinone in the same way, a strongly reddish-tinged blue dyestuff with a bromine content of 28% is obtained.

EXAMPLE 2

7 parts of 1,5-dibromo-4,8-diacetylaminoanthraquinone are introduced into 100 parts of 20% strength oleum, and dissolved whilst stirring. 5 parts of boric acid are then added, during which addition the temperature rises to 70° C. The mixture is warmed to 150 to 160° C. and stirred for 4 hours during which time bromine is evolved. After cooling, the reaction mixture is poured into a mixture of 500 parts of ice water and the precipitated dyestuff is filtered off, washed with water and dilute aqueous ammonia solution and finally washed until neutral. After drying, 4.9 parts of a blue dyestuff with a bromine content of 23% are obtained. From aqueous dispersion, the dyestuff dyes polyethylene terephthalate, cellulose acetate and polyamide fibres in pure blue shades of very good fastness to light and to heat-setting.

If instead of 1,5 - dibromo - 4,8 - diacetylaminoanthraquinone the same amount of 1,5-dibromo-4,8-di-(ethoxycarbonylamino)-anthraquinone is employed, a more reddish-tinged blue dyestuff with a bromine content of 27% and with similar tinctorial properties is produced.

A dyestuff which dyes the synthetic fibres mentioned in similar shades is obtained if 7 parts of 1,5-dibromo-4,8-dibenzoylaminoanthraquinone are reacted. The dyestuff contains 24% of bromine.

1,5-dibromo-4,8-dibenzoylaminoanthraquinone can be manufactured as follows:

A mixture of 20 parts of 1,5-dibenzoylaminoanthraquinone, 48 parts of nitrobenzene, 0.5 part of iodine and 43 parts of bromine is mixed with a solution of 2.5 parts of sodium bromate in 30 parts of water and is then stirred for 20 hours at 60 to 65° C. under closed conditions. The 1,5 - dibromo - 4,8 - dibenzoylaminoanthraquinone which crystallises uniformly in yellow needles is filtered off at 15° C., washed with ethanol and water and dried. The bromine content is 26.2% and the melting point is above 340° C. (uncorrected). The yield is 93% of theory.

If in the preceding paragraph 1,5-dibenzoylaminoanthraquinone is replaced by the 1,8-isomer, 4,5-dibromo-1,8-dibenzoylaminoanthraquinone having a melting point of above 340° C. (uncorrected) is obtained.

1,5-dibromo-4,8 - dipropionylaminoanthraquinone with a bromine content of 30.82% and a melting point of above 340° C. (uncorrected) and 1,8-dibromo-4,5-diacetylaminoanthraquinone with a bromine content of 33% and a melting point of 324° C. (uncorrected) can be manufactured, in a similar manner.

EXAMPLE 3

10 parts of 1,5-dibromo - 4,8 - diacetylaminoanthraquinone are introduced at 60 to 65° C. into a solution of 4.9 parts of boric acid in 123 parts of monohydrate during 1 hour whilst stirring. The temperature is then gradually raised to 135 to 140° C., without further stirring, and the reaction mixture kept at this temperature for 3 hours. It is then poured onto ice and water and the dystuff obtained as a blue precipitate is worked-up as indicated in Example 1. 7.5 parts of 1,5-dihydroxy-4,8-diaminoanthraquinone are obtained, containing 26% of bromine. The dyestuff dyes polyethylene terephthalate fibres light-fast blue shades.

EXAMPLE 4

6.5 parts of 1,8-diacetylamino-4,5-dibromanthraquinone are introduced into a solution of 4.9 parts of boric acid in 123 parts of 10% strength oleum at 135 to 140° C. during 45 minutes. The reaction mixture is stirred for a further 4 hours at this temperature and is then carefully poured onto ice, and the dyestuff which precipitates is worked-up in accordance with the description of Example 1. 4.5 parts of 1,5-dihydroxy-4,8-diaminoanthraquinone containing 19% of bromine are obtained. From aqueous dispersion, the dyestuff dyes acetate, polyamide and polyethylene terephthalate fibres light-fast blue shades.

EXAMPLE 5

An isomer mixture of 4 parts of 1,8-dibromo-4,5-diacetylaminoanthraquinone and 6 parts of 1,5-dibromo-4,8-diacetylaminoanthraquinone is introduced during 1 hour, whilst stirring, into a solution, warmed to 60 to 65° C., of 4.9 parts of boric acid in 123 parts of 10% strength oleum, and is dissolved. The solution is slowly warmed to 135 to 140° C. without further stirring, kept at this temperature for a further 3 hours, and then poured out onto a mixture of ice and water. After working-up the blue precipitate, 7.5 parts of dyestuff with a bromine content of 26% are obtained. The dyestuff dyes polyethylene terephthalate fibres light-fast blue shades.

If the isomer mixture used in paragraph 1 is replaced by 10.6 parts of 1,5 - dibromo - 4,8 - dipropionylaminoanthraquinone, 6.8 parts of a dyestuff with a bromine content of 21%, which dyes polyester fibres light-fast pure blue shades, are obtained.

EXAMPLE 6

A mixture of 100 parts of the dyestuff obtained according to Example 1, paragraph 1,1000 parts of monohydrate and 8.5 parts of paraformaldehyde is stirred for 4 hours at 55 to 60° C. and then poured out into cold water. The resulting precipitate is filtered off, washed until neutral and dried. 99 parts of a dyestuff with a bromine content of 21% are obtained which from aqueous dispersion dyes polyethylene terephthalate fibres light-fast pure blue shades which in artificial light show a desired displacement towards more greenish-tinged shades.

EXAMPLE 7

10 parts of the dyestuff from Example 1, paragraph 1, are introduced whilst stirring into a solution, prepared at 5 to 10° C., of 105 parts of monohydrate and 17.9 parts of methanol. The temperature is raised to 150° C. during 5 hours, and the reaction mixture is stirred for a further 6 hours at this temperature and then poured into 800 parts of ice water. The dyestuff which precipitates is filtered off, washed until neutral and dried. 9.4 parts of a methylated dyestuff which dyes polyester fibres significantly more greenish-tinged blue shades than the starting dyestuff are obtained.

DYEING INSTRUCTION 1 part of the dyestuff obtained in accordance with Example 1, paragraph 1, is ground wet with 2 parts of a 50% strength aqueous solution of sulphite cellulose waste lye and dried.

This dyestuff preparation is stirred with 40 parts of a 10% strength aqueous solution of a condensation product of octadecyl alcohol and 20 mols of ethylene oxide, and 4 parts of a 40% strength acetic acid solution are added. A dyebath of 4000 parts is prepared therefrom by dilution with water.

100 parts of a cleaned polyester fibre fabric are introduced into this bath at 50° C., the temperature is raised to 120 to 130° C. in half an hour, and dyeing is carried out for 1 hour at this temperature with the vessel closed. Thereafter the fabric is thoroughly rinsed. A pure blue dyeing of excellent fastness to light is obtained.

What is claimed is:

1. A process for the manufacture of blue dispersion dyestuffs, wherein a 1,5-dibromo-4,8-diacylaminoanthraquinone or a 1,8-dibromo-4,5-diacylaminoanthraquinone the acyl residue being lower aliphatic carbonyl benzoyl or lower alkoxy carbonyl, is heated with sulphuric acid, in the presence of boric acid and the resulting bromine-containing 1,5-dihydroxy-4,8- diamino- or 1,8-dihydroxy-4,5-diamino-anthraquinone is recovered.

2. A process as claimed in claim 1, wherein the starting material is a dibromodiacylaminoanthraquinone in which the acyl residue is derived from a lower aliphatic monocarboxylic acid.

3. A process as claimed in claim 2, wherein the starting material is a dibromodiacylaminoanthraquinone in which the acyl residue is derived from an aliphatic carboxylic acid containing 2 to 6 carbon atoms.

4. A process as claimed in claim 1, wherein at least 5 parts of sulphuric acid and at least 0.1 part of boric acid are used per 1 part of the dibromodiacylaminoanthraquinone.

5. A process as claimed in claim 1, wherein the reaction temperature is within the range of from 40 to 200° C.

6. A process as claimed in claim 5, wherein the reaction temperature is within the range of from 100 to 180° C.

7. A process as claimed in claim 1, wherein the sulphuric acid used contains not more than 40% of $SO_3$.

References Cited

UNITED STATES PATENTS

| | | | |
|---|---|---|---|
| 2,604,480 | 7/1952 | Seymour et al. | 260—380 |
| 3,147,284 | 9/1964 | Rhyner | 260—347.7 |

FOREIGN PATENTS

| | | | |
|---|---|---|---|
| 1,574,809 | 7/1969 | France | 260—381 |

OTHER REFERENCES

Lubs, The Chemistry of Synthetic Dyes. pp. 349–350 (1955).

LORRAINE A. WEINBERGER, Primary Examiner

R. GERSTL, Assistant Examiner

U.S. Cl. X.R.

260—377, 379